United States Patent
Guthrie (10) Patent No.: US 10,865,554 B2
(45) Date of Patent: Dec. 15, 2020

(54) PILOT OPERATED DIAPHRAGM FILL VALVE AND ASSEMBLY FOR REDUCING HYDROSTATIC SHOCK

(71) Applicant: Lavelle Industries, Inc., Burlington, WI (US)

(72) Inventor: Kevin J. Guthrie, Wind Lake, WI (US)

(73) Assignee: Lavelle Industries, Inc., Burlington, WI (US)

( * ) Notice: Subject to any disclaimer, the term of this patent is extended or adjusted under 35 U.S.C. 154(b) by 38 days.

(21) Appl. No.: 16/044,697

(22) Filed: Jul. 25, 2018

(65) Prior Publication Data

US 2019/0032315 A1 Jan. 31, 2019

Related U.S. Application Data

(60) Provisional application No. 62/536,734, filed on Jul. 25, 2017.

(51) Int. Cl.
*F16K 1/36* (2006.01)
*E03D 1/32* (2006.01)
*F16K 21/18* (2006.01)
*F16K 31/20* (2006.01)
*F16K 31/34* (2006.01)

(52) U.S. Cl.
CPC ............. *E03D 1/32* (2013.01); *F16K 1/36* (2013.01); *F16K 21/18* (2013.01); *F16K 31/20* (2013.01); *F16K 31/34* (2013.01); *Y10T 137/7472* (2015.04)

(58) Field of Classification Search
CPC . F16K 1/36; F16K 21/18; F16K 41/20; E03D 1/32
See application file for complete search history.

(56) References Cited

U.S. PATENT DOCUMENTS

| | | | | |
|---|---|---|---|---|
| 5,623,961 | A | * | 4/1997 | Nichols-Roy ............. E03D 1/33 137/377 |
| 5,715,859 | A | * | 2/1998 | Nichols-Roy ............. E03D 1/32 137/414 |
| 5,836,346 | A | | 11/1998 | Nichols-Roy |
| 6,260,574 | B1 | * | 7/2001 | Nichols-Roy ............. E03D 1/32 137/414 |

(Continued)

*Primary Examiner* — Kevin R Barss
(74) *Attorney, Agent, or Firm* — Joseph S. Heino; Erin E. Kaprelian (57) ABSTRACT

The fill valve and assembly provides an elongated cylindrical water supply tube and a valve seat disposed atop the water supply tube. The valve seat comprises a circular inner valve seat portion and a circular outer valve seat portion between which extend support structures in the form of a plurality of lands and spokes. A bridge is disposed in the center of the valve seat structure about the inner valve seat portion and atop the plurality of lands and spokes. A main diaphragm valve is disposed atop the valve seat structure such that the bridge is disposed between the valve seat structure and the main diaphragm valve. The present invention provides for a thinner and softer durometer EPDM material for the main diaphragm which is advantageous for improved function while the bridge prevents the thin section of the main diaphragm valve from being abraded or cut when high pressures try to push the diaphragm into the spokes.

16 Claims, 6 Drawing Sheets

(56) References Cited

U.S. PATENT DOCUMENTS

| | | | |
|---|---|---|---|
| 6,450,195 B1 * | 9/2002 | Gil | E03D 1/32 |
| | | | 137/414 |
| 6,755,209 B2 | 6/2004 | Wey | |
| 7,661,438 B2 * | 2/2010 | Nichols-Roy | F16K 31/26 |
| | | | 137/411 |
| 8,166,997 B2 | 5/2012 | Fukuzawa et al. | |
| 8,360,093 B2 | 1/2013 | Conrad et al. | |
| 8,387,652 B2 | 3/2013 | Guthrie | |

* cited by examiner

PILOT OPERATED DIAPHRAGM FILL VALVE AND ASSEMBLY FOR REDUCING HYDROSTATIC SHOCK

This application claims priority to Provisional Patent Application No. 62/536,734, filed on Jul. 25, 2017.

FIELD OF THE INVENTION

The present invention relates generally to plumbing fixtures and to the component parts that are used in them. More particularly, it relates to a fill valve and assembly for flush systems used in gravity flush toilets. It also relates to such a fill valve and assembly that prevents plumbing water "hammer" or hydrostatic shock while also providing a structure that preserves the integrity of the fill valve diaphragm that is used in the assembly.

BACKGROUND OF THE INVENTION

Conventional toilets typically employ a generally rectangular porcelain tank mounted immediately above a porcelain bowl from which a quantity of water is rapidly drained in order to flush waste from the bowl into the sewer system. One very common design uses a flapper valve made of an elastomeric material that normally covers the drain outlet of the tank. When the flush handle on the outside of the tank is manually depressed, the flapper valve is lifted and the head of water in the tank drains through the drain outlet into the bowl, thereby flushing the contents of the bowl into the sewer system. The flapper valve is designed with an inverted air chamber so that it initially floats as it is lifted away from the drain outlet in the bottom of the tank. This allows sufficient flushing water to flow into the bowl even if the user immediately releases the flush handle. When the water level in the tank drops, the tank is automatically refilled through a fill valve connected to a high pressure water supply line.

The typical fill valve for the tank comprises a ballcock or pilot fill valve mounted in the tank on top of a riser which extends through an opening in the bottom of the tank and is connected to a pressurized water line in the house. When the tank drains, a float connected to the ballcock or pilot fill valve descends. This activates the ballcock or pilot fill valve and it begins to refill the tank with water at a rate much slower than the rate at which water flows through the drain outlet. When the tank is nearly empty, the flapper valve closes. The tank continues to refill as the float connected to the ballcock or pilot fill valve rises. At the same time water from the ballcock or pilot fill valve enters an overflow tube and refills the bowl to the normal standing water level to provide a trap seal. Once the float reaches a predetermined height indicating that the tank is full, the ballcock or pilot fill valve completely turns off.

The foregoing general conventional arrangement is still widely used today but has been modified in recent years with new designs to meet low volume (1.6 and 1.28 gpf—gallons per flush) flush toilets required by regulations in many jurisdictions. One pilot fill valve construction that is owned by the assignee of the present application is disclosed in U.S. Pat. No. 5,836,346 entitled "Pilot Operated Diaphragm Fill Valve" (the '346 patent). The written disclosure of the '346 patent is incorporated by reference within this disclosure.

Fill valves made in accordance with the foregoing construction typically include a riser assembly, a valve housing mounted on an upper end of the riser assembly, and a pilot operated diaphragm valve mounted in the valve housing. A float housing is connected to the valve housing. A float arm of a combination float and float arm has a first end pivotally connected to the valve housing for opening and closing a pilot orifice in the diaphragm valve. A second end of the float arm is connected to the float. The float is located in the float housing which has an inlet opening for allowing water to spill into the float housing so that the float rises upwardly and the first end of the float arm fully seals off the pilot orifice.

One factor that exists today relative to fill valves is that water municipalities are increasing water pressures from 80 psig (pounds per square inch gauge—measured relative to ambient atmospheric pressure, which is always measured as 0 psig) to 150 psig for the purpose of moving water farther distances downline and higher distances upwardly, as is the case in supplying water to high rise buildings and the like. Pressures of up to 170 psig are not unheard of. However, these higher water pressures can significantly reduce the cycle life of the type of diaphragm valve mentioned above.

Another common reality in this art is that fill valves of present manufacture tend to use a diaphragm valve of higher durometer material, typically rubber, on the order of 70 on the shore hardness scale. This higher durometer material, coupled with thicker downward face sealing surfaces of the valve seat allow the diaphragm valve to shut off "hard" or abruptly, which causes water "hammer" or hydrostatic shock that can be heard well outside the toilet tank. Accordingly, it is desirable that an improved fill valve assembly be available to overcome the limitations of diaphragm valve degradation, reduced duty cycle and water hammering.

SUMMARY OF THE INVENTION

As stated at the outset, the assignee of the present application has a related United States patent, the '346 patent, which is incorporated herein by reference and in its entirety. There are similarities in the present invention. For example, the fill valve and assembly of the present invention is substantially identical to that of the '346 patent in that it provides flush tank fill valve assembly, comprising an elongated adjustable height tubular riser having a quick connect to a main valve housing at the upper end and a threaded lower end adapted to be mounted in a bottom of a flush tank for connection to a source of water, which may be pressurized at up to 150 psig. It also provides a pilot operated diaphragm fill valve including a vacuum break valve and a unitary combined float and arm assembly. Though related, the valve and assembly of the present invention improves over the fill valve and assembly disclosed and claimed in the '346 patent. Differences in the fill valve and assembly of the present invention and that of the '346 patent are that the present invention provides for a thinner and softer durometer EPDM (ethylene propylene diene monomer (M-class) rubber) material for the main diaphragm which is advantageous for improved function. Further, a "bridge" or support is provided in the present invention and is a structure which prevents the thin section of the diaphragm from being abraded, cut or damaged when high pressures try to push the diaphragm into "spokes" that are formed in the valve seat.

The foregoing and other features of the fill valve and assembly of the present invention will be apparent from the following detailed description when read in conjunction with the accompanying drawings.

DETAILED DESCRIPTION

Figures 1, 2:
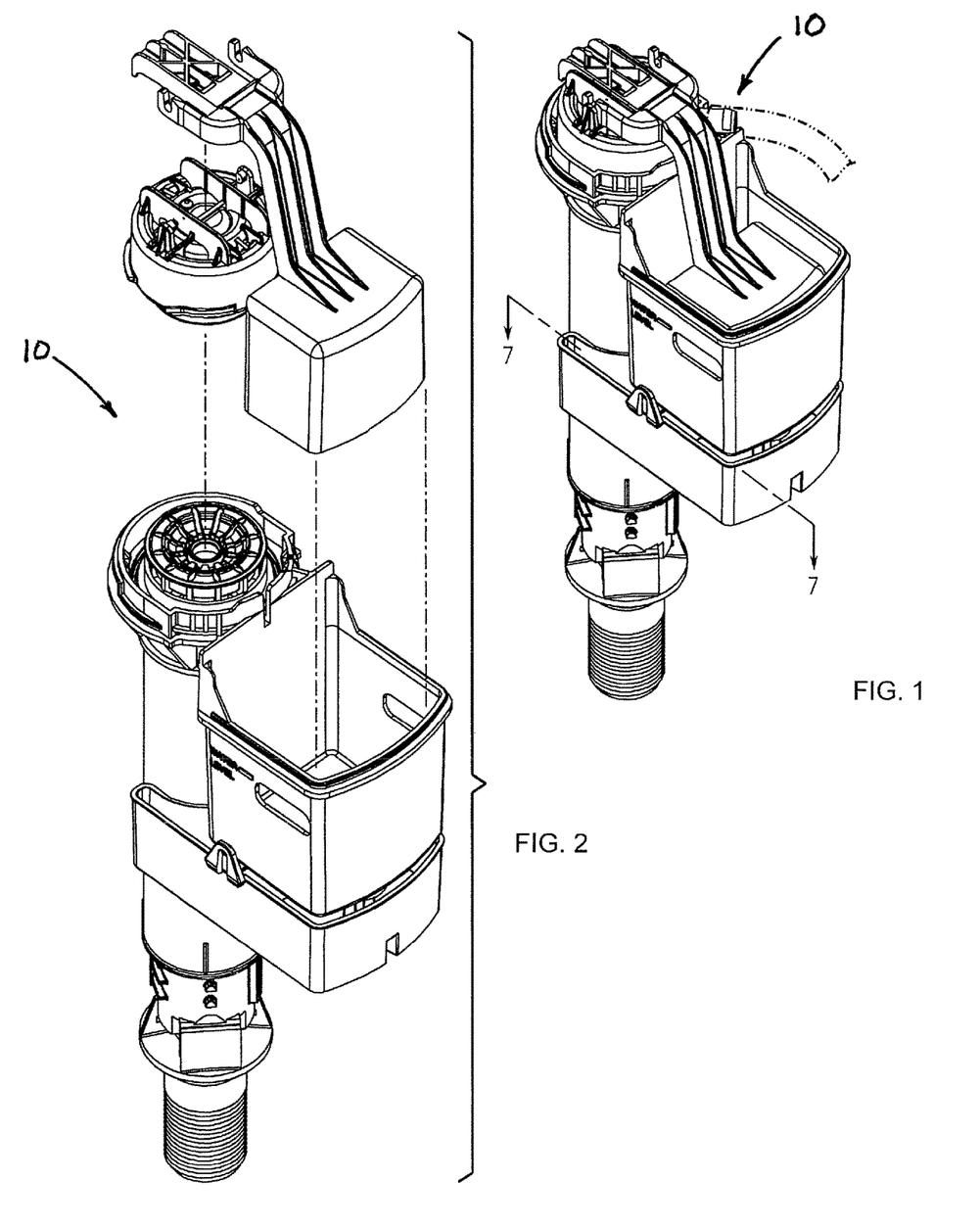
FIG. 1 is a top, front and left side perspective view of the fill valve and assembly of the present invention.
FIG. 2 is the same view shown in FIG. 1 but showing the fill valve and assembly as partially exploded such that the top of the supply tube can be visualized.
Figure 15:
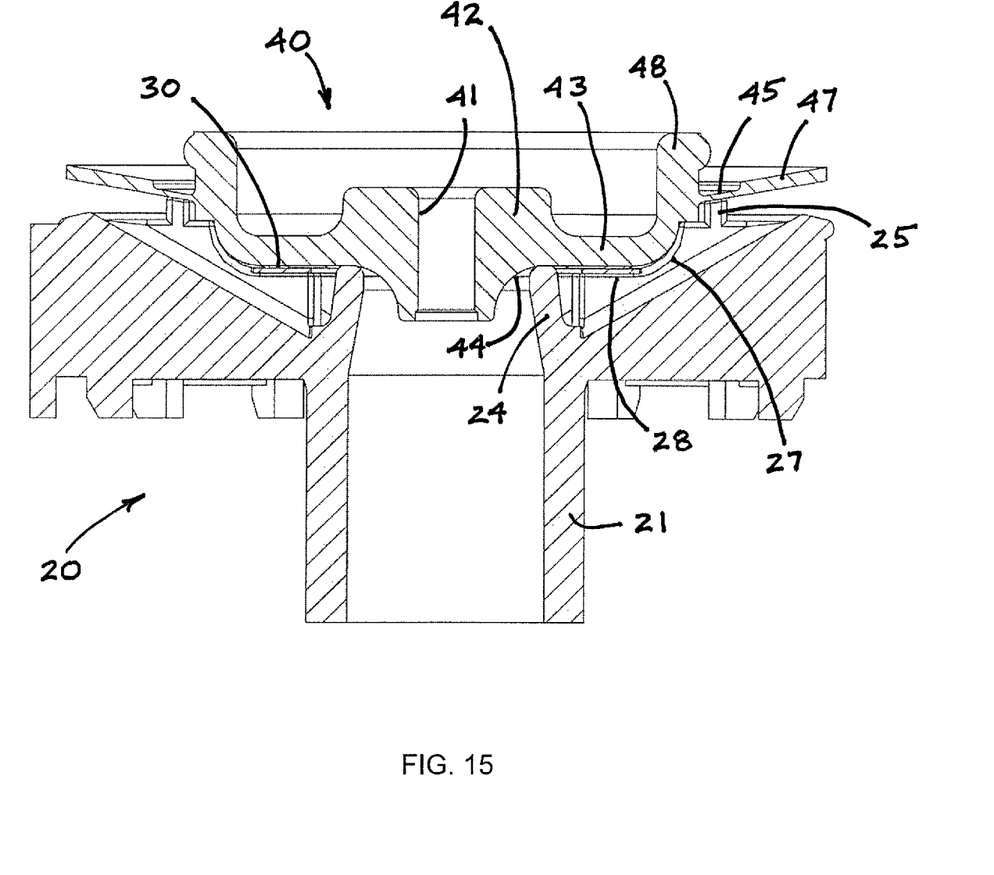
FIG. 15 is an enlarged side and cross-sectioned elevational view showing the valve seat structure and diaphragm valve as seated on the valve seat structure and configured in accordance with the present invention.

Referring now to the drawings in detail, wherein like-numbered elements refer to like elements throughout, FIGS. 1 and 2 illustrate a fill valve assembly and apparatus that is constructed generally in accordance with the preferred embodiment of the present invention, the assembly and apparatus being designated generally by the numeral 10. As shown in FIG. 15, the assembly 10 comprises a cylindrical water supply tube structure, generally identified 20, which allows water to flow upwardly through it and toward a main diaphragm valve, generally identified 40. FIG. 15 is discussed further herein.

Figure 3:
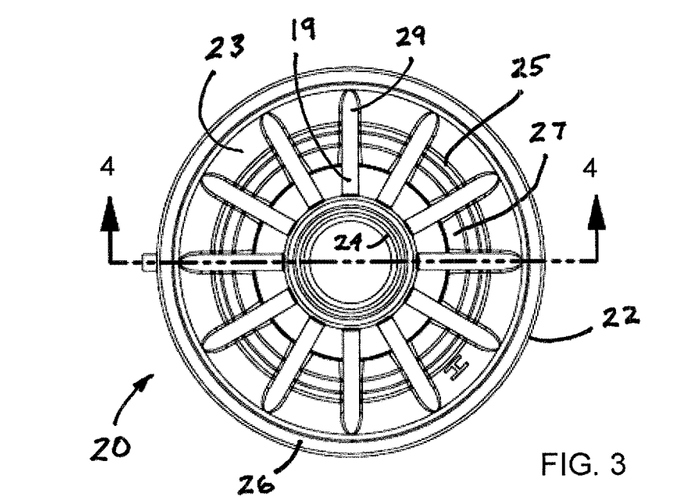
FIG. 3 is a top plan view of a supply tube constructed in accordance with the present invention.

FIG. 3 shows a top plan view of a supply tube constructed in accordance with the present invention. More particularly, FIG. 3 shows the valve seat structure 22 of the supply tube structure 20. The valve seat structure 22 comprises a plurality of "lands" or supporting surfaces 23, wherein adjacent lands 23 are separated by a plurality of spoke openings 29. The spoke openings 29 are provided to allow for water flow within the valve seat structure 22. In the preferred embodiment, twelve lands 23 and twelve spoke openings 29 are provided, but this number of lands 23 and openings 29 is not a limitation of the present invention. Each spoke opening 29 further comprises an innermost portion 19 that runs up to, but stops short of, an inner valve seat portion 24. The uppermost portion of each land 23 comprises an arcuate rib 25 and this arcuate rib 25 is discussed further herein with respect to FIG. 4. In addition to the inner valve seat portion 24, an outer valve seat portion 26 is illustrated in FIGS. 3 and 4 as well.

Figure 4:
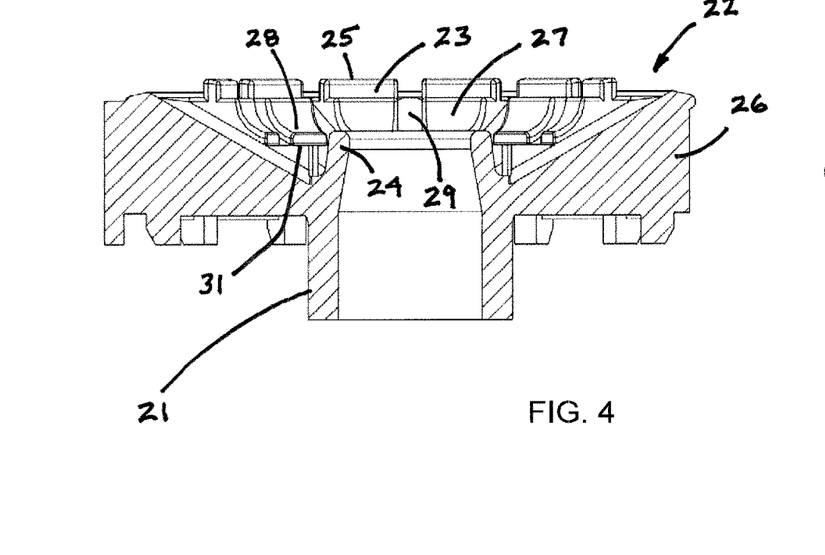
FIG. 4 is an enlarged and cross-sectioned side elevational view of the supply tube shown in FIG. 3 and taken along line 4-4 of FIG. 3.

FIG. 4 is an enlarged and cross-sectioned side elevational view of the supply tube structure 20 shown in FIG. 3, taken along line 4-4 of FIG. 3. The supply tube structure 20 includes a cylindrical water supply tube 21. Atop the supply tube structure 20 is the valve seat structure 22, shown in FIG. 3. As discussed with respect to FIG. 3, the valve seat structure 22 comprises a plurality of lands 23 separated by spokes 29. The uppermost portion of each land 23 comprises an arcuate rib 25 that extends above the valve seat structure 22. Moving downwardly from each rib 25 and toward the inner valve seat portion 24, each corresponding land 23 comprises a descending arcuate portion 27 and a flat portion 28. The descending arcuate portion 27 and flat portion 28 each defines a continuous surface, although such need not be formed to be a continuous surface. Innermost in the valve seat structure 22 is the circular inner valve seat portion 24. The circular inner valve seat portion 24 may be a radial bead. The valve seat structure 22 further comprises an outer valve seat portion 26. The outer valve seat portion 26 is concentrically disposed about the inner valve seat portion 24. A disk recess portion 31 is shown and will be discussed further herein.

Figure 5:
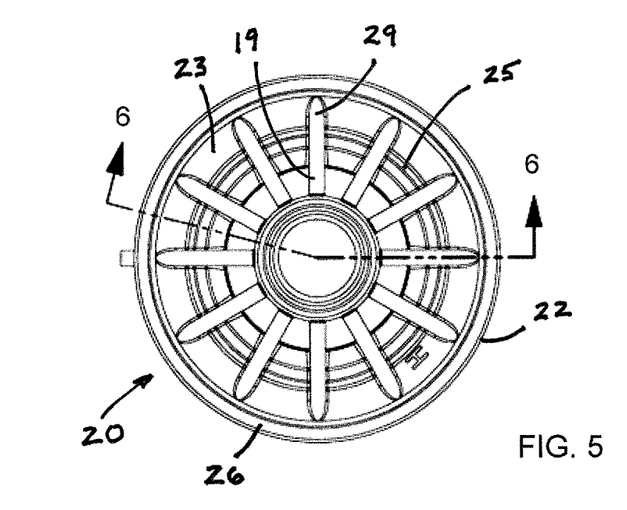
FIG. 5 is a view similar to that shown in FIG. 3.
Figure 6:
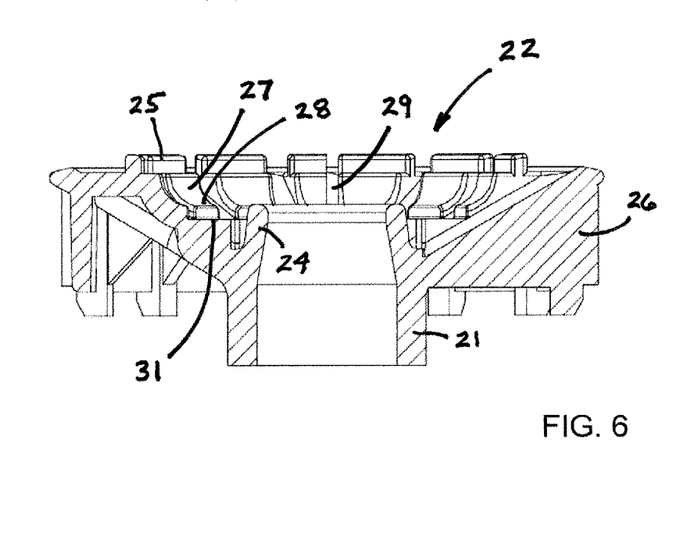
FIG. 6 is an enlarged and cross-sectioned side elevational view of the supply tube shown in FIG. 5 and taken along line 6-6 of FIG. 5.

FIG. 5 is a view similar to that shown in FIG. 3 of the valve seat structure 22 but shows a different cut line for the cross-sectioned view shown in FIG. 6. Again, it will be seen that the valve seat structure 22 includes a plurality of lands 23 separated by a plurality of spoke openings 29. An innermost portion 19 of each spoke opening 29 extends towards the center of the valve seat structure 22. The uppermost portion of each land 23 includes an arcuate rib 25, including a descending arcuate portion 27 and a flat portion 28, as discussed with respect to FIG. 4.

FIG. 6 is an enlarged and cross-sectioned side elevational view of the supply tube 20 shown in FIG. 5 and taken along line 6-6 of FIG. 5. Similar to FIG. 4, the supply tube structure 20 includes a cylindrical water supply tube 21, atop which is the valve seat structure 22. As discussed with respect to FIG. 5, a plurality of lands 23 separated by spokes 29 are included within the valve seat structure 22. A plurality of arcuate ribs 25 extend above the valve seat structure 22, where each land 23 includes an arcuate rib 25. Descending from each rib 25 is a descending arcuate portion 27 and a flat portion 28.

Figure 16:
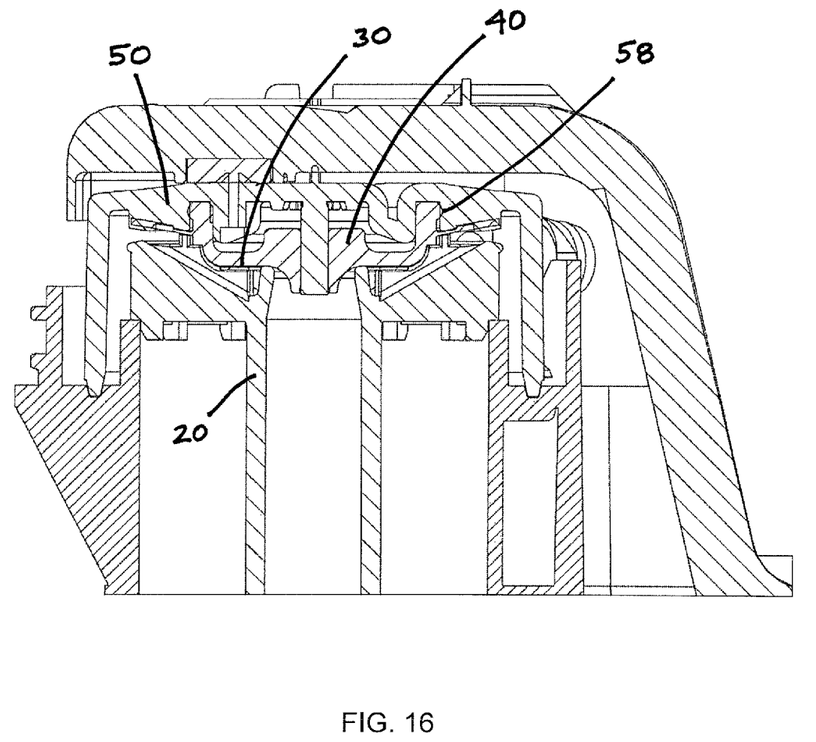
FIG. 16 is another enlarged side and cross-sectioned elevational view showing the valve seat structure, the diaphragm valve and the cap, together with other elements, all constructed in accordance with the present invention.

In one embodiment, a "bridge" or disk 30 is disposed on top of the flat portion 28 of the land 23. The words "bridge" and "disk" may be interchangeable and are used herein to identify or describe the same structure. As used herein, a disk 30 refers to a substantially flat washer-like piece that is received by the valve seat structure 22. The disk 30 is supported by the flat portion 28 of each land 23 and spans over the innermost portion 19 of each spoke opening 29. The disk 30 may comprise a snap fit ring, a sonic welded ring, a plate welded ring, or any other ring made of a suitable material. The purpose of the disk 30 is that it "bridges" across the innermost portion 19 of each spoke opening 29 thereby supporting the disk 30 and preventing damage to the medial diaphragm portion 43 of the diaphragm 40 that is positioned above the bridge 30 and that engages the bridge 30 during each flush and fill cycle. See FIGS. 15 and 16. In another embodiment the flat portion 28 of each arcuate rib 25 comprises a disk recess portion 31. In some examples, the disk recess portions 31 may be disposed at the location where the valve seat structure 22 meets the supply tube structure 20. Collectively, the disk recess portions 31 of each land 23 may be sized such that a disk or other additional structure may be received within the supply tube structure 20. See also FIGS. 4 and 6.

Figure 7:
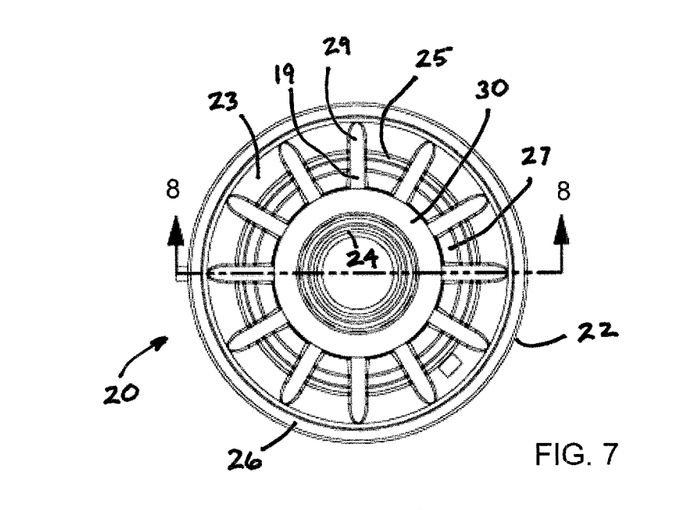
FIG. 7 is a top plan view of another supply tube constructed in accordance with the present invention but showing a washer-like disk disposed within the top of the supply tube.
Figure 9:
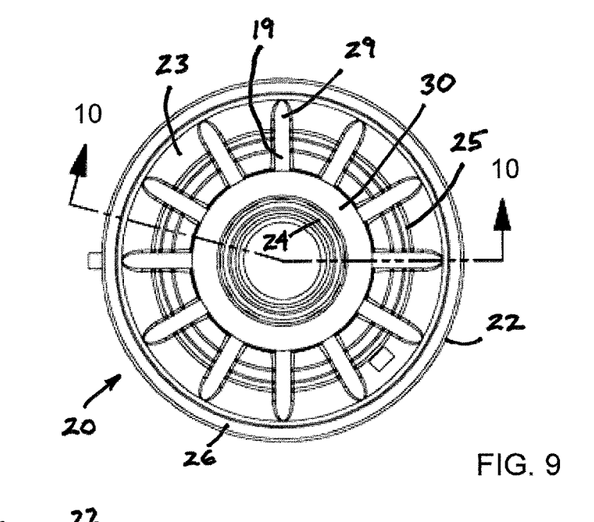
FIG. 9 is a view similar to that shown in FIG. 7.

FIG. 7 is a top plan view of another supply tube structure 20 constructed in accordance with the present invention, and FIG. 9 is a view similar to the view of FIG. 7. FIGS. 7 and 9 show a valve seat structure 22, similar to the valve seat structure 22 discussed with respect to FIGS. 3 and 5. Included within the valve seat structure of FIGS. 7 and 9, however, is a disk 30 in accordance with the present invention and as described above.

Figure 8:
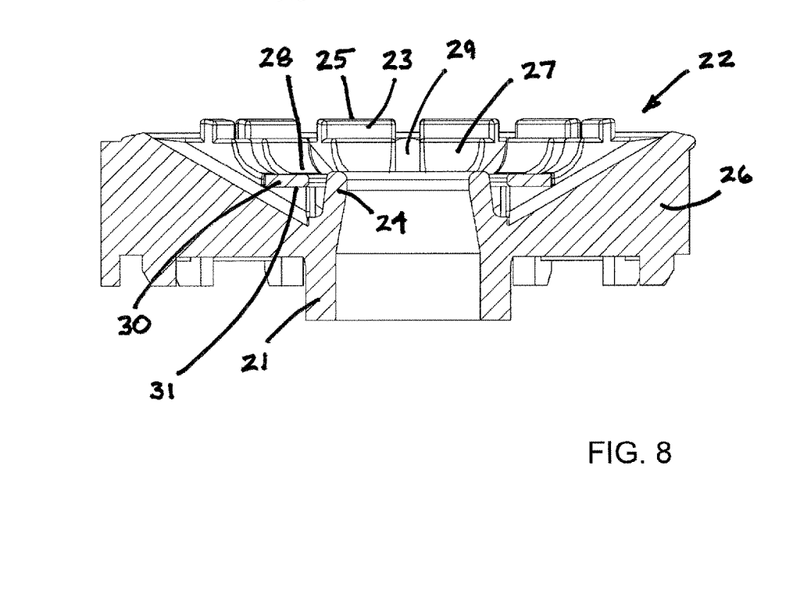
FIG. 8 is an enlarged and cross-sectioned side elevational view of the supply tube and disk shown in FIG. 7 and taken along line 8-8 of FIG. 7.

FIG. 8 is an enlarged and cross-sectioned side elevational view of the supply tube shown in FIG. 7 and taken along line 8-8 of FIG. 7. FIG. 8 shows a supply tube structure 20, similar to the supply tube structure 20 discussed with respect to FIGS. 4 and 6. FIG. 8 further shows the valve seat portion 22, including the disk 30, discussed with respect to FIG. 7. As shown in FIG. 8, the disk 30 is disposed at a lower surface of the valve seat portion 22, and is circumferentially disposed about the valve seat portion 22. The disk 30 is centered by the collective disk receiving portions 31 of each land 23. The disk receiving portion 31 is similar to that discussed with respect to FIGS. 4 and 6; however, the disk receiving portion 31 as shown is sized specifically to receive the disk 30.

Figure 10:
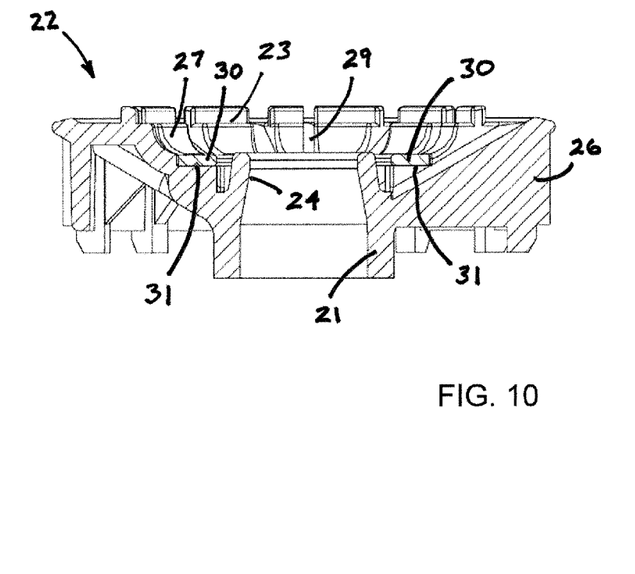
FIG. 10 is an enlarged and cross-sectioned side elevational view of the supply tube and disk shown in FIG. 9 and taken along line 10-10 of FIG. 9.

FIG. 10 is an enlarged and cross-sectioned side elevational view of the supply tube shown in FIG. 9 and taken along line 10-10 of FIG. 9. Similar to the supply tube of FIG. 7, FIG. 9 shows a supply tube structure 20 and a valve seat structure 22. FIG. 9 provides an additional view of the disk 30, discussed with respect to FIG. 8. As can be appreciated from FIG. 9, the disk 30 is visible on both sides of the cross-sectioned view, due to disk 30 being circumferentially disposed with respect to the valve seat structure 22. The disk 30 is further shown resting atop, or received by, the collective disk receiving portions 31. Similar to the disk 30 itself, the disk receiving portion 31 of each land 23 is disposed circumferentially with respect to the valve seat structure 22.

Figure 11:
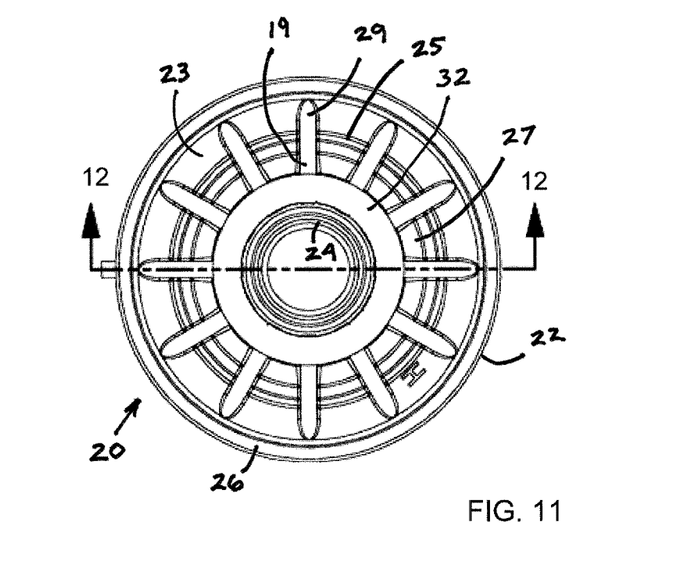
FIG. 11 is a top plan view of yet another supply tube constructed in accordance with the present invention but showing a washer-like tape structure disposed within the top of the supply tube.

FIG. 11 is a top plan view of yet another supply tube structure 20 constructed in accordance with the present invention. FIG. 11 shows the valve seat structure 22, including a plurality of lands 23 separated by a plurality of spoke openings 29, with an innermost portion 19 of each spoke opening 29 extending to the center of the valve seat structure 22. FIG. 11 further shows a disk 32 that is configured as a washer-like tape structure (i.e., be substantially circular with an opening in the middle) and may be manufactured of a Mylar® type tape or any similarly suitable substance. In some examples, the tape disk 32 may be disposed circumferentially about the center of the valve seat structure 22, as shown in FIG. 11. The tape disk 30 may be simply supported by the flat portion 28 of each land 23.

Figure 12:
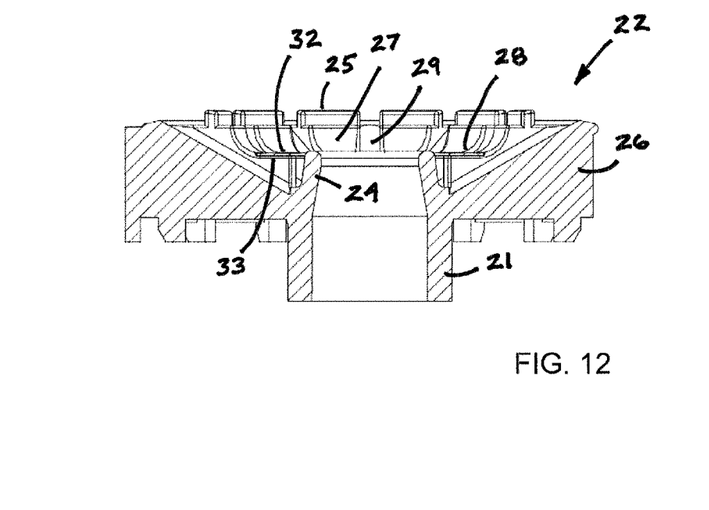
FIG. 12 is an enlarged and cross-sectioned side elevational view of the supply tube and tape structure shown in FIG. 11 and taken along line 12-12 of FIG. 11.

FIG. 12 is an enlarged and cross-sectioned side elevational view of the supply tube shown in FIG. 11 and taken along line 12-12 of FIG. 11. As shown in FIG. 12, the supply tube includes a supply tube structure 20, atop which is valve seat portion 22. As shown in FIG. 12, the tape disk 32 is disposed about the center of the valve seat structure 22. The tape disk 32 further rests upon a tape disk recess 33 as similarly described above relative to the disk 30. The recess 33 may be sized to accommodate or receive a tape disk 32; that is, recess 33 may be sized specifically to receive the tape disk 32 but not to receive a disk 30 (as discussed previously with respect to FIGS. 7-10).

Figure 13:
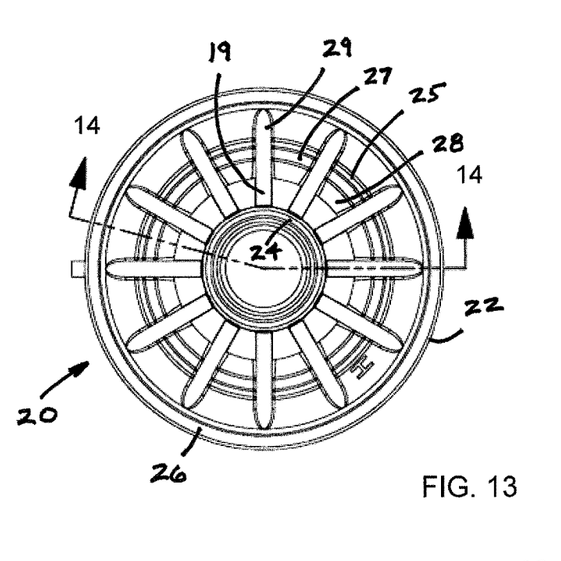
FIG. 13 is a view similar to that shown in FIG. 11 but with the tape structure removed.

FIG. 13 is a view similar to that shown in FIG. 11 but without the tape disk shown removed. Thus, as shown in FIG. 13, the valve seat structure 22 includes the plurality of lands 23 separated by a plurality of spoke openings 29. Each spoke opening 29 includes an innermost portion 19. The uppermost portion of each land 23 includes an arcuate rib 25. Further, the valve seat 22 includes the inner portion 24 and the outer portion 26.

Figure 14:
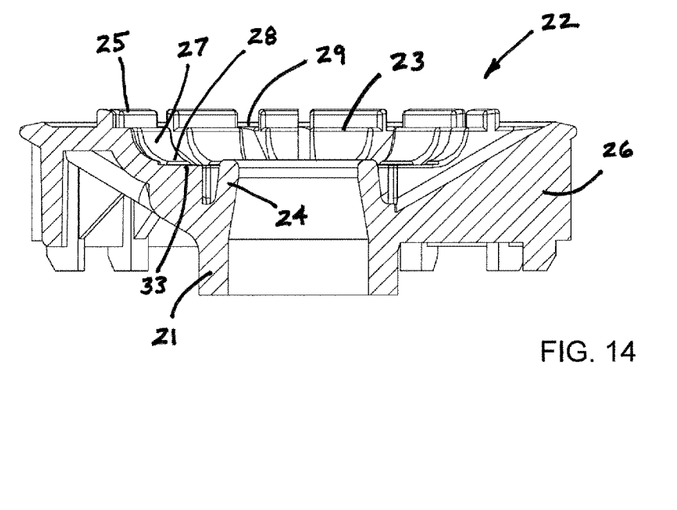
FIG. 14 is an enlarged and cross-sectioned side elevational view of the supply tube shown in FIG. 13 and taken along line 14-14 of FIG. 13.

FIG. 14 is an enlarged and cross-sectioned side elevational view of the supply tube shown in FIG. 13 and taken along line 14-14 of FIG. 13. As shown in FIG. 14, the supply tube includes a supply tube structure 20 and a valve seat portion 22. As can be seen in FIG. 14, the recesses 33 are shown without the tape disk 32 (shown in FIGS. 11-12). Thus, it can be seen that the recess 33 may be sized with a depth to receive a tape structure but not to receive a more substantial structure, such as a disk.

Referring now to FIG. 15, it will be seen that the main diaphragm valve 40 sits on top of the valve seat structure 22 with the bridge 30 being disposed between those two structures. The main diaphragm valve 40 comprises a central hub portion 42 having a central aperture 41 defined in it. At the bottom of the central hub portion 42 is a radial sealing surface 44 which alternatively engages and disengages the radial seal bead 24 of the valve seat 22. Extending outwardly, the valve 40 comprises a medial diaphragm portion 43 which is positioned above the bridge 30. Extending upwardly from the medial diaphragm portion 43 is a sealing flange 48 having a sealing bead which is pressed into an annular recess 58 formed in an upper valve housing or cap, generally identified 50. Extending outwardly from the medial diaphragm portion 43 is a thin circumferential portion 45, the portion 45 being sealingly captured between the arcuate ribs 25 of the valve seat 22 and a portion of the valve cap 50. Again, see FIG. 15. Beyond the thin circumferential portion 45 is a radially extending thin peripheral lip 47 that acts as a vacuum break valve, all in accordance with the teachings of the '346 patent. See also FIG. 16.

Significantly, the diaphragm 40 of the present invention is made of a softer 55 to 62 durometer, abrasion resistant Chlorazone® (Chlorazone is a registered mark of Lavelle Industries, Inc.) EPDM material. Other fill valves are made of higher durometers, such as 70, and have a much thicker downward face sealing surface allowing them to shut off hard or abruptly causing "water hammer." Further, municipalities are increasing water pressures from 80 psig to as high as 170 psig to move water farther and higher distances. It can be appreciated by one skilled in the art that these higher pressures can reduce the cycle life of the diaphragm 40. To improve the cycle life of the diaphragm 40, and particularly the medial diaphragm portion 43 thereof, a bridge 30 has been added to the present invention which straddles the spoke openings 19, 29. This bridge 30 prevents the thin section and soft durometer diaphragm 40 from being abraded and even cut when high pressures try to push the diaphragm into the spokes 19, 29.

This unique radial design allows the radial sealing surface 44 of the central hub portion 42, which alternatively engages and disengages the radial seal bead 24 of the valve seat 22, to slide progressively (more slowly) over the inner supply tube radius until it fills the opening much like a cork in a bottle. The combination of these two features allows the fill valve 10 of the present invention to shut off angularly radially or slowly, thereby preventing plumbing water hammer, or hydrostatic shock.

In all other respects, the fill valve of the present invention functions substantially in accordance with the fill valve described in the '346 patent. That is, when the main control valve opens, inlet water flow by way of the inlet supply tube 20 is allowed to pass radially outward from the valve seat 40, then spilling over the edge and flowing down into the space between the fill tube or supply tube and the valve housing to pass into and fill the tank. A certain amount of water is allowed to flow by way of an outlet in the valve housing cap 50 and a flexible refill tube (not shown) to flow into the overflow tube in the fixture to fill the trap. Again, this is a brief description of the fill valve concepts that are incorporated herein as described and claimed in the previously mentioned prior art.

Although the foregoing has been described with a certain degree of particularity, it is to be understood that the present disclosure has been made by way of example only and that numerous changes in the construction and the arrangement of components, some of which have been alluded to, may be resorted to without departing from the spirit and scope of the invention as it is described.

I claim:

1. An apparatus, comprising:
    a water supply tube;
    a valve seat structure disposed atop the water supply tube, wherein the valve seat structure further comprises:
        a substantially circular inner valve seat portion;
        a substantially circular outer valve seat portion disposed concentrically about the circular inner valve seat portion;
        a plurality of lands extending outwardly from the inner valve seat portion to the outer valve seat structure, wherein each land of the plurality of lands further comprises:
            a rib extending upwardly from the valve seat structure;
            a descending arcuate portion extending downwardly from the rib; and
            a flat portion; and
        a plurality of spoke openings disposed between adjacent lands of the plurality of lands;
    a bridge disposed above the valve seat structure; and
    a main diaphragm valve disposed above the bridge.

2. The apparatus of claim 1, wherein the bridge is disposed between the flat portion of the lands and the main diaphragm valve.

3. The apparatus of claim 1, wherein the bridge comprises a disk.

4. The apparatus of claim 3, wherein the disk comprises a tape structure.

5. The apparatus of claim 1, wherein the main diaphragm valve further comprises:
    a central hub portion;
    a central aperture defined within the central hub portion;
    a radial sealing surface disposed at the bottom of the central hub portion;
    a medial diaphragm portion extending outwardly from the main diaphragm valve;
    a sealing flange;
    a circumferential portion to engage with the arcuate ribs of the valve seat and a portion of a valve cap; and
    a radially extending peripheral lip.

6. An apparatus, comprising:
    a water supply tube;
    a valve seat structure disposed atop the water supply tube and including a bridge recess portion, wherein the valve seat structure further comprises:
        a substantially circular inner valve seat portion;
        a substantially circular outer valve seat portion concentrically disposed about the circular inner valve seat portion;
        a plurality of lands extending outwardly from the inner valve seat portion to the outer valve seat structure; and
        a plurality of spoke openings disposed between adjacent lands of the plurality of lands;
    a bridge disposed within the bridge recess portion of the valve seat structure; and
    a main diaphragm valve disposed above the bridge.

7. The apparatus of claim 6, wherein each land of the plurality of lands further comprises:
    an arcuate rib extending upwardly from the valve seat structure;
    a descending arcuate portion extending downwardly from the rib; and
    a flat portion.

8. The apparatus of claim 6, wherein the bridge comprises a tape structure.

9. The apparatus of claim 6, wherein the main diaphragm valve further comprises:
    a central hub portion;
    a central aperture defined within the central hub portion;
    a radial sealing surface disposed at the bottom of the central hub portion;
    a medial diaphragm portion extending outwardly from the main diaphragm valve;
    a sealing flange;
    a circumferential portion to engage with the arcuate ribs of the valve seat and a portion of a valve cap; and
    a radially extending peripheral lip.

10. An assembly, comprising:
    a cylindrical water supply tube structure, the cylindrical water supply tube structure further comprising:
        a cylindrical water supply tube;
        a valve seat structure disposed atop the cylindrical water supply tube and comprising:
            a circular inner valve seat portion; and
            an outer valve seat portion;
        a bridge disposed in the center of the valve seat structure about the inner valve seat portion, wherein:
            the bridge comprises a washer-like structure; and
            the bridge is one of a disk or a tape structure; and
        a main diaphragm valve disposed atop the valve seat structure such that the bridge is disposed between the valve seat structure and the main diaphragm valve.

11. The assembly of claim 10, wherein the valve seat structure further comprises:
    a plurality of lands, the lands further comprising:
        an uppermost arcuate rib extending above the valve seat structure;
        a descending arcuate portion; and
        a flat portion; and
    a plurality of spoke openings, wherein:
        each spoke opening is disposed between adjacent lands; and
        each spoke opening comprises an innermost portion.

12. The assembly of claim 11, wherein:
    the bridge is supported by the flat portion of each land of the plurality of lands; and
    the bridge spans over the innermost portion of each spoke opening of the plurality of spoke openings.

13. The assembly of claim 10, wherein the main diaphragm valve further comprises:
- a central hub portion, the central hub portion having a central aperture defined therein;
- a radial sealing surface disposed at the bottom of the central hub portion to alternately engage and disengage with the inner valve seat portion of the valve seat structure;
- a medial diaphragm portion extending outwardly from the main diaphragm valve; and
- a thin circumferential portion extending outwardly from the medial diaphragm portion.

14. The assembly of claim 13, wherein the thin circumferential portion is sealingly captured between the arcuate ribs of the valve seat and a portion of a valve cap.

15. The assembly of claim 10, wherein the main diaphragm valve further comprises a sealing flange extending upwardly from the medial diaphragm portion, the sealing flange further comprising a sealing bead, wherein the sealing bead is pressed into an annular recess.

16. The assembly of claim 15, wherein the annular recess is formed within an upper valve cap.

* * * * *